United States Patent
Qu et al.

(10) Patent No.: US 10,845,958 B2
(45) Date of Patent: Nov. 24, 2020

(54) METHOD FOR CONTROLLING IMAGE-RECORDING DEVICE

(71) Applicant: Shanghai Xiaoyi Technology Co., Ltd., Shanghai (CN)

(72) Inventors: Zhisong Qu, Beijing (CN); Xuewu Zhang, Beijing (CN); Changjiang Wei, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/957,870

(22) Filed: Apr. 19, 2018

(65) Prior Publication Data
US 2018/0307385 A1    Oct. 25, 2018

(30) Foreign Application Priority Data

Apr. 19, 2017    (CN) .......................... 2017 1 0257818

(51) Int. Cl.
| | | |
|---|---|---|
| *G06F 3/0482* | (2013.01) | |
| *H04N 5/232* | (2006.01) | |
| *G06F 3/0481* | (2013.01) | |

(52) U.S. Cl.
CPC ........ *G06F 3/0482* (2013.01); *G06F 3/04817* (2013.01); *H04N 5/23216* (2013.01)

(58) Field of Classification Search
CPC ...... G06F 3/0488; G06F 3/023; G06F 3/0482; H04N 5/772; G08C 17/04
See application file for complete search history.

(56) References Cited

U.S. PATENT DOCUMENTS

| | | | | |
|---|---|---|---|---|
| 2007/0110416 A1* | 5/2007 | Yamaguchi | ............ | G03B 17/08 396/27 |
| 2008/0003988 A1* | 1/2008 | Richardson | ....... | H04L 29/06027 455/414.3 |
| 2008/0202823 A1* | 8/2008 | Won | ..................... | G06F 3/03547 178/18.01 |
| 2012/0084548 A1* | 4/2012 | Cheng | .................... | G06F 3/023 713/2 |
| 2013/0016960 A1* | 1/2013 | Yang | ..................... | G03B 17/08 396/25 |
| 2013/0040696 A1* | 2/2013 | Forstall | .................. | G06F 3/038 455/550.1 |
| 2014/0043456 A1* | 2/2014 | Doi | ..................... | G02B 23/2476 348/74 |

(Continued)

Primary Examiner — Rashawn N Tillery
(74) Attorney, Agent, or Firm — Cantor Colburn LLP

(57) ABSTRACT

System and method for controlling an image-recording device are disclosed. The image-recording device includes a control button. The method may include: starting a menu page, the menu page having a plurality of action instructions; receiving a press on the control button; when the press is a first preset press type, selecting one of the plurality of action instructions based on a sliding operation on the menu page, wherein one action instruction is selected at each time of sliding; and when the press is a second preset press type, executing a currently selected action instruction and closing the menu page. The first preset press type is one of a long press and a short press. The second preset press type is the other one of a long press and a short press. The long press has a longer pressing time than the short press.

6 Claims, 3 Drawing Sheets

(56) References Cited

U.S. PATENT DOCUMENTS

| | | | |
|---|---|---|---|
| 2014/0270688 A1* | 9/2014 | Han | H04N 5/772 |
| | | | 386/225 |
| 2016/0110996 A1* | 4/2016 | Cheng | G08C 17/04 |
| | | | 340/12.22 |
| 2017/0019580 A1* | 1/2017 | Boghosian | H04N 5/23203 |
| 2017/0249059 A1* | 8/2017 | Houseworth | G06F 3/0488 |
| 2017/0269811 A1* | 9/2017 | Tsujimura | G06F 3/04817 |
| 2017/0272654 A1* | 9/2017 | Poindexter, Jr. | H04N 5/23245 |
| 2017/0324890 A1* | 11/2017 | Moskovchenko | H04N 5/2252 |

* cited by examiner

METHOD FOR CONTROLLING IMAGE-RECORDING DEVICE

CROSS-REFERENCE TO RELATED APPLICATION

This application is based upon and claims priority from Chinese Patent Application No. 201710257818.5, filed on Apr. 19, 2017, the disclosure of which is expressly incorporated herein by reference in its entirety.

TECHNICAL FIELD

The present disclosure generally relates to user-machine interaction technology, and more specifically to a method for controlling image-recording device.

BACKGROUND

As the photography and videography industry continues to develop, the functions of an image-recording device have increased. Currently, a touch screen is commonly used to switch between various functions of an image-recording device. A selection is made from the many action instructions on the menu page, and the selected action instruction is then executed. For example, the current executable instruction may be a choice to instruct the image-recording device to take a photo or record a video.

However, image-recording devices are currently used in a variety of settings, including settings in which the touch function of a touch screen cannot be used. For example, using a waterproof case when recording in underwater settings may result in an inability to touch the touch screen. The currently available solutions normally use a plurality of physical buttons for switching between functions. For example, the GoPro® Hero™ 5 camera has two physical buttons: one physical button is responsible for switching recording modes, and the other physical button is used for control the camera shutter to take a photograph or for starting/stopping video recording.

However, in order to design the exterior of the image-recording device to be simple and pleasing, presently the fewest physical buttons as possible are employed. For example, there is only one physical button. Moreover, from the user's perspective, the degree to which camera operations become mired in minor details increases as the number of buttons increases, which exacts a higher learning cost and even leads to decreased user experience.

In currently available technology, a single physical button still cannot be employed to switch between functions when an image-recording device with fewer physical buttons is employed to achieve different functions, which results in the functions that the user can use being too limited, and thus does not meet the user's needs. Specifically, the single physical button definition currently available is as follows: a camera may be turned on or off by applying a long press on the physical button, and a preset function may be executed by applying a short press on the physical button. For example, when the photograph function of the image-recording device is selected in advance through the touch screen, the photograph instruction can be executed by the user through just a short press, which fulfills the photograph function; when the video-recording function of the image-recording device is selected in advance through the touch screen, the start recording instruction and the stop recording instruction may be executed through just a short press, which fulfills the video-recording function.

The disclosed methods and systems address one or more of the problems listed above.

SUMMARY

Consistent with one embodiment of the present disclosure, a method for controlling an image-recording device is disclosed. The image-recording device includes a control button. The method may include: starting a menu page, the menu page having a plurality of action instructions; receiving a press on the control button; when the press is a first preset press type, selecting one of the plurality of action instructions based on a sliding operation on the menu page, wherein one action instruction is selected at each time of sliding; and when the press is a second preset press type, executing a currently selected action instruction and closing the menu page. The first preset press type is one of a long press and a short press. The second preset press type is the other one of a long press and a short press. The long press has a longer pressing time than the short press.

Consistent with another embodiment of the present disclosure, an apparatus for controlling an image-recording device is disclosed. The image-recording device includes a control button. The apparatus may include a memory storing instructions. The apparatus may also include a processor configured to execute the instructions to: start a menu page, the menu page having a plurality of action instructions; receive a press on the control button; when the press is a first preset press type, select one of the plurality of action instructions based on a sliding operation on the menu page, wherein one action instruction is selected at each time of sliding; and when the press is a second preset press type, execute a currently selected action instruction and closing the menu page. The first preset press type is one of a long press and a short press. The second preset press type is the other one of a long press and a short press. The long press has a longer pressing time than the short press.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
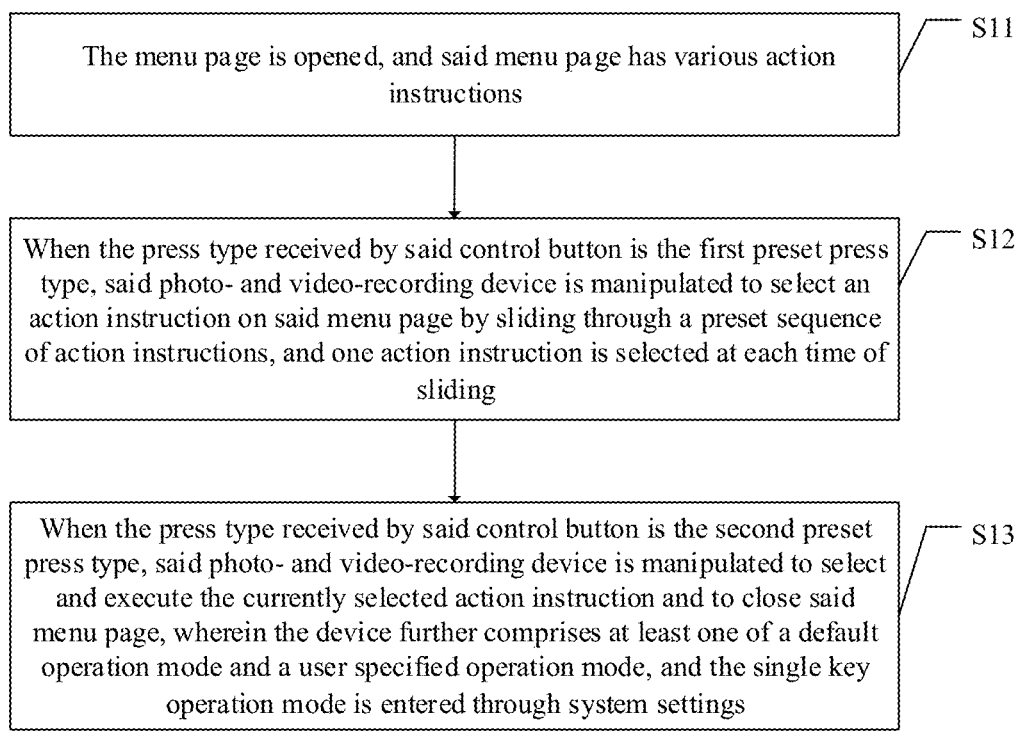
FIG. 1 is a flowchart of a method for controlling an image-recording device, according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Currently, the various functions of an image-recording device are switched mainly through a touch screen. Normally, a plurality of physical buttons is employed to switch functions in settings where the touch function of a touch screen cannot be used. However, in order to design the exterior of the image-recording device to be simple and pleasing, presently the fewest physical buttons as possible are employed. For example, there is only one physical button. Moreover, from the user's perspective, the degree to which camera operations become mired in minor details increases as the number of buttons increases, which exacts a higher learning cost and even leads to decreased user experience. In currently available technology, however, a single physical button still cannot be employed to switch between functions when an image-recording device with fewer physical buttons is employed to achieve different functions, which results in the functions that the user can use being too limited, and thus does not meet the user's needs.

As described above, in currently available technology a physical button is often employed to represent a specific function, resulting in a strong correlation between the functions that can be realized by the image-recording device and the number of physical buttons. Moreover, when the number of physical buttons is reduced, even to the point that only a single physical button is used, the number of functions that the image-recording device can fulfill also drops to very few, which results in the functions that the user can use being too limited.

In an exemplary embodiment consistent with the present disclosure, when the menu page is opened, the menu page has various action instructions; when the press type received by the control button is the first preset press type, the image-recording device is manipulated to select an action instruction on the menu page by sliding through a preset sequence of action instructions, and one action instruction is selected at each time of sliding; when the press type received by the control button is the second preset press type, the image-recording device is manipulated to select and execute the currently selected action instruction and to close the menu page; here, the first preset press type is one of a long press and a short press, the second preset press type is the other one of a long press and a short press, and the press type is a long press when the control button is pressed longer than or equal to a preset duration, otherwise the press type is a short press. The aforementioned solution enables the selection of an action instruction by sliding through a menu page that has various action instructions based on the press type received by the control button, and the switching between functions of the image-recording device is realized by the selection and execution of one of various action instructions. It is possible to have various action instructions when there is just one control button because the number of action instruction types on the menu page and the number of control buttons are not correlated. Therefore, the user's need to vary which function is used can be met by employing just a single control button.

In order to make the aforementioned purpose, characteristics, and benefits of the present disclosure more evident and easier to understand, detailed descriptions are provided below of specific embodiment examples of the present disclosure in reference to the attached drawings.

FIG. 1 is a flowchart of a method 10 for controlling an image-recording device, according to an exemplary embodiment of the present disclosure. For example, the image-recording device may be configured for recording photos or videos. Referring to FIG. 1, the method 10 may include the following step S11 to step S13.

Step S11: the menu page is opened, and the menu page has various action instructions.

Step S12: when the press type received by the control button is the first preset press type, the image-recording device is manipulated to select an action instruction on the menu page by sliding through a preset sequence of action instructions, and one action instruction is selected at each time of sliding.

Step S13: when the press type received by the control button is the second preset press type, the image-recording device is manipulated to select and execute the currently selected action instruction and to close the menu page.

Further, in an exemplary embodiment of the present disclosure, the image-recording device may only have a single physical button, e.g. underwater cameras and others, or may have a plurality of physical buttons. Here, a physical button refers to a physical button configured on the image-recording device, which can be operated through pressing. When the image-recording device only has a single physical button, the control button is this only physical button; when the image-recording device has a plurality of physical buttons, the control button may be any one of the plurality of physical buttons or a preset one among them.

In a specific embodiment of step S11, the menu page can be triggered to open when the image-recording device is in single key operation mode and when the press type received by the control button is the second preset press type, e.g. when a long press is received by the control button.

Here, when the image-recording device has a plurality of physical buttons, the single key operation mode can be entered through system settings, e.g. one of the physical buttons is configured as the control button, and then single key operations are conducted based on this control button.

In an exemplary embodiment of the present disclosure, it is possible that the menu page is opened and a single control button is employed to switch functions only when the user is in single key operation mode; yet the default or user specified operation mode is employed when not in single key operation mode, increasing user convenience.

Further, the first preset press type is one of a long press and a short press, the second preset press type is the other one of a long press and a short press, and the press type is a long press when the control button is pressed longer than or equal to a preset duration, otherwise the press type is a short press.

Furthermore, the preset duration should not be configured too long, otherwise implementation will be more difficult and user convenience will be reduced; also, the preset duration should not be configured too short, otherwise distinguishing between a long press and a short press will be difficult. In a nonrestrictive example, the preset duration may be configured at a duration between 1 s and 3 s.

Figure 2:
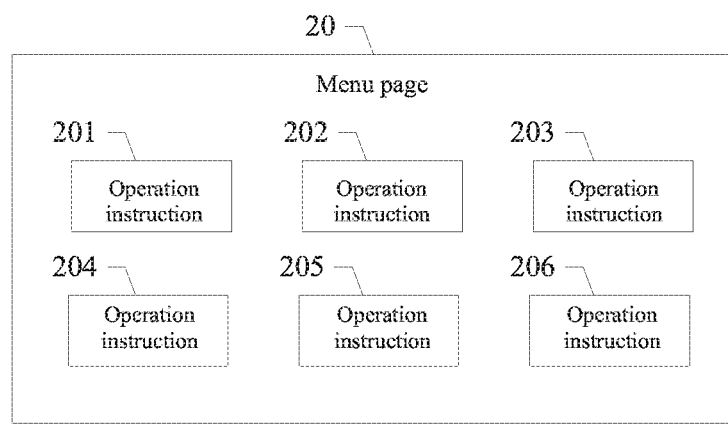
FIG. 2 is a schematic diagram illustrating a menu page of an image-recording device, according to an exemplary embodiment of the present disclosure.

In a specific embodiment, the menu page may have various action instructions. FIG. 2 shows a menu page. The menu page 20 may have an action instruction 201, an action instruction 202, an action instruction 203, an action instruction 204, an action instruction 205, and an action instruction 206.

Further, the various action instructions may include: a shut-down instruction, a photograph instruction, a video recording instruction, an album view instruction, and a WiFi on/off instruction.

Here, the shut-down instruction may be used to shut-down the device; the photograph instruction may be used to take pictures in order to record static images; the video recording instruction may be used to record video in order to record dynamic images; the album view instruction may be used to view photos or videos that have already been recorded; the WiFi on/off instruction may be used to turn WiFi on or off.

It should be noted that in the example described, the menu page 20 includes the six action instructions. In specific embodiments, however, the specific action instructions may be selected based on real applications. In embodiment examples of the present disclosure, the specific number of action instructions on the menu page 20 is not restricted.

Continuing to refer to FIG. 1, in a specific embodiment of step S12, when the press type received by the control button is the first preset press type, e.g. a short press, the image-recording device is manipulated to select an action instruction on the menu page by sliding through a preset sequence of action instructions, and one action instruction is selected at each time of sliding.

The sliding sequence may be any suitable sequence, e.g. from left to right, from top to bottom, etc. Taking the menu page 20 shown in FIG. 2 as an example, the preset sliding and selecting sequence is from action instruction 201 to action instruction 206. When a short press is received by the control button for the first time, the image-recording device may be manipulated to slide from action instruction 201 to action instruction 202 and select the action instruction 202; when a short press is received by the control button for the second time, the image-recording device may be manipulated to slide from action instruction 202 to action instruction 203 and select the action instruction 203; Selections are made in sequence until action instruction 206, then when a short press is received by the control button again, the image-recording device may be manipulated to slide from action instruction 206 back to action instruction 201 and select the action instruction 201.

In a specific embodiment of step S13, when the press type received by the control button is the second preset press type, e.g. a long press, the image-recording device is manipulated to select and execute the currently selected action instruction and to close the menu page.

Specifically, when the action instruction selected by image-recording device is the photograph instruction and when a long press is received by the control button, the image-recording device executes the photograph instruction in order to enter photograph mode and closes the menu page. In the photograph mode, the photograph operation may be conducted by applying a short press to the control button, i.e. the photograph operation is conducted once every time a short press is applied to the control button.

When the action instruction selected by the image-recording device is the video recording instruction and when a long press is received by the control button, the image-recording device executes the video recording instruction in order to enter video recording mode and closes the menu page. In the video recording mode, video recording can be started by applying a short press to the control button, and then the video recording can be concluded by once again applying a short press to the control button.

When the action instruction selected by the image-recording device is the shut-down instruction and when a long press is received by the control button, the image-recording device executes the shut-down instruction in order to start shutting down and closes the menu page.

When the action instruction selected by the image-recording device is the album view instruction and when a long press is received by the control button, the image-recording device executes the album view instruction in order to enter album view mode and closes the menu page. In the album view mode, a photograph or video can be opened in succession by applying a short press to the control button, and the next photograph or video can be displayed by once again applying a short press to the control button.

When the action instruction selected by the image-recording device is the WiFi on/off instruction and when a long press is received by the control button, the image-recording device executes the WiFi on/off instruction in order to enter WiFi on/off mode and closes the menu page. In the WiFi on/off mode, a selection can be made to switch WiFi from on to off, or to switch WiFi from off to on by applying a short press to the control button.

In one embodiment, the control button may be the only button on the image-recording device in order to meet the need to design the exterior of the image-recording device to be simple and pleasing, and in order to meet the user's need for simple operations.

In one embodiment, the first preset press type can be configured to be a short press, and the second preset press type can be configured to be a long press.

Specifically, the opening of the menu page through a long press, compared to the opening of the menu page through a short press, can avoid the easy opening of the menu page when the action button is touched or hit by mistake. Moreover, when a short press is received by the control button, the image-recording device is manipulated to select an action instruction on the menu page by sliding through a preset sequence of action instructions, and one action instruction is selected at each time of sliding; compared to a long press, the short press can improve the operating frequency of the action instruction for sliding and selecting. Moreover, when the press type received by the control button is the second preset press type, the image-recording device is manipulated to select and execute the currently selected action instruction, and the menu page is closed; compared to a short press, the second preset press type can avoid the easy execution of action instructions when the action button is touched or hit by mistake.

Of course, in other variations, the first preset press type may also be a long press, and correspondingly the second preset press type may be a short press.

In one embodiment, an action instruction can be selected among various instructions by sliding through a menu page that has various action instructions based on the press type received by the control button, and the switching between functions of the image-recording device is realized by the selection and execution of one of various action instructions. It is possible to have various action instructions when there is just one control button because the number of action instruction types on the menu page and the number of control buttons are not correlated. Therefore, the user's need to vary which function is used can be met by employing just a single control button.

Figure 3:
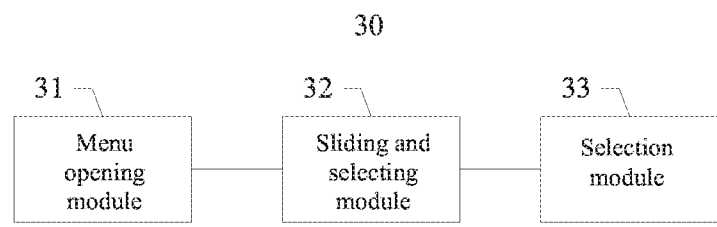
FIG. 3 is a block diagram of an apparatus for controlling an image-recording device, according to an exemplary embodiment of the present disclosure.

FIG. 3 is a block diagram of a control apparatus 30 for controlling an image-recording device, according to an exemplary embodiment of the present disclosure. The control apparatus 30 may include a menu opening module 31, a sliding and selecting module 32, and a selection module 33.

The menu opening module 31 is suitable for opening the menu page, and the menu page has various action instructions.

The sliding and selecting module 32 is suitable for manipulating the image-recording device to select an action instruction on the menu page by sliding through a preset sequence of action instructions when the press type received by the control button is the first preset press type, and one action instruction is selected at each time of sliding;

the selection module 33 is suitable for manipulating the image-recording device to select and execute the currently selected action instruction and to close the menu page when the press type received by the control button is the second preset press type;

here, the first preset press type is one of a long press and a short press, the second preset press type is the other one of a long press and a short press, and the press type is a long press when the control button is pressed longer than or equal to a preset duration, otherwise the press type is a short press.

Further, the control apparatus 30 triggers the menu opening module to open the menu page when the image-recording device is in single key operation mode and when the press type received by the control button is the second preset press type.

Further, the action instructions include: a shut-down instruction, a photograph instruction, a video recording instruction, an album view instruction, and a WiFi on/off instruction.

Further, the control button is the only button on the image-recording device.

Further, the first preset press type is a short press, and the second preset press type is a long press.

For more details about the image-recording device control apparatus, please refer to the relevant descriptions of the image-recording device control method in the previous text and FIG. 1 through FIG. 2. No redundant description will be detailed here.

The present disclosure also provides a camera. The camera may include the aforementioned image-recording device control apparatus, and the camera can execute the aforementioned image-recording device control method.

Figure 4:
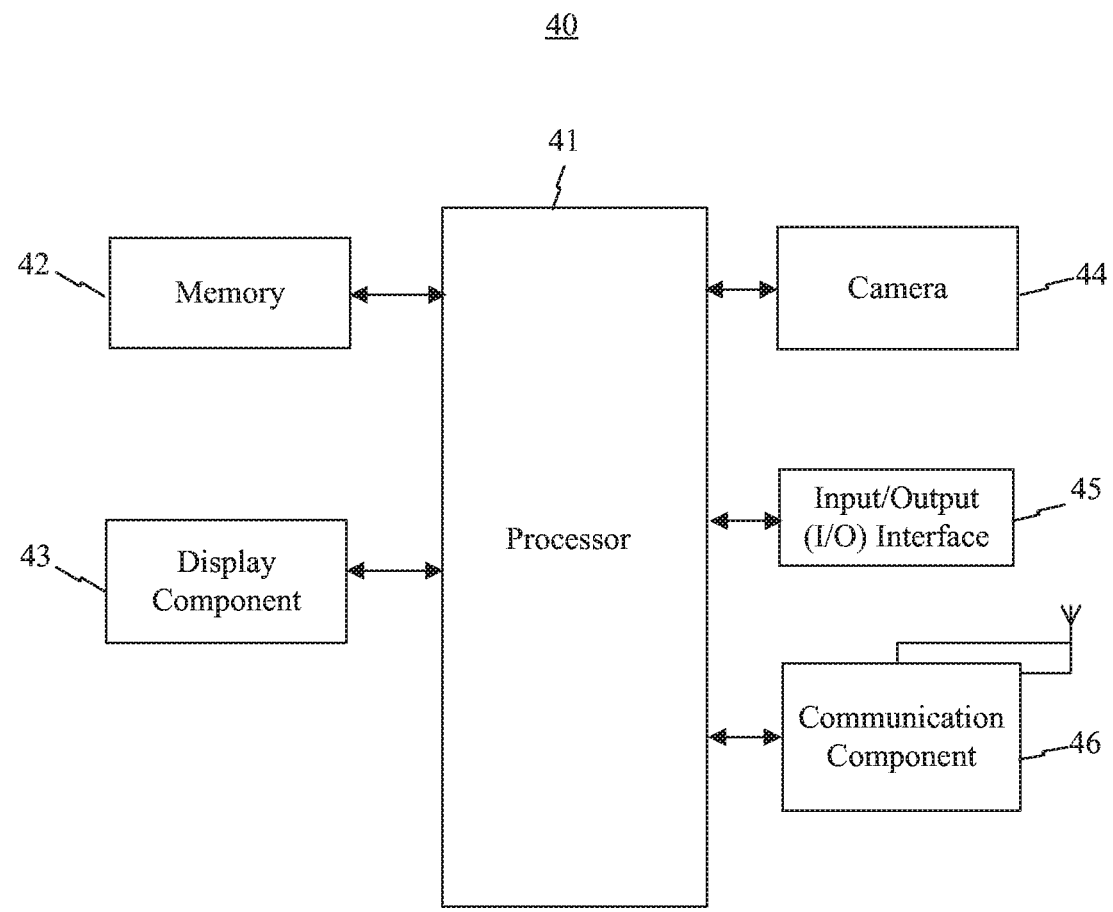
FIG. 4 is a block diagram of an image-recording device, according to an exemplary embodiment of the present disclosure.

FIG. 4 is a block diagram of an image-recording device 40, according to an exemplary embodiment of the present disclosure. For example, the device 40 may include a part or the whole of the aforementioned control apparatus 30 (FIG. 3). Referring to FIG. 40, the device 40 includes a processor 41, a memory 42, a display component 43, a camera 44, an input/output (I/O) interface 45, and a communication component 46.

The processor 41 typically controls overall operations of the device 40, such as the operations associated with recording photos or videos, playing recorded photos or videos, displaying control menus, etc. The processor 41 is configured to execute instructions to perform all or part of the steps in the above described methods. Moreover, the processor 41 may include one or more modules which facilitate the interaction between the processor 41 and other components of the device 40.

The memory 42 is configured to store various types of data to support the operation of the device 40. Examples of such data include instructions for any applications or methods operated on the device 40, pictures, video, etc. The memory 42 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The display component 43 includes a screen providing an output interface between the device 40 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In the disclosed embodiment, the processor 41 may control the display component 43 to display a menu page (FIG. 2).

The camera 44 is configured to capture photos and/or videos. Consistent with the disclosed embodiments, the camera 44 may be a digital camera, a charge-coupled device (CCD) or complementary metal-oxide semiconductor (CMOS) image sensor, etc.

The I/O interface 45 provides an interface between the processor 41 and peripheral interface modules of the device 40, such as a keyboard, a click wheel, buttons, and the like. In the disclosed embodiments, the I/O interface 44 may receive, from the peripheral interface modules, a user command for controlling the device 40, and relay the user command to the processor 41, which then performs the disclosed methods.

The communication component 46 is configured to facilitate communication, wired or wirelessly, between the device 40 and other devices. The device 40 can access a wireless network based on a communication standard, such as WiFi, 2G, 3G, 4G, 5G, or a combination thereof. In one exemplary embodiment, the communication component 46 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 40 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 42, executable by the processor 41 in the device 40, for performing the above-described methods. For example, the non-transitory computer-readable storage medium may be a read-only memory, a random access memory (RAM), a CD-ROM, a magnetic tape, a floppy disc, an optical data storage device, and the like.

Notwithstanding the above disclosure of the present disclosure, it does not restrict the present disclosure. Any person of skill in the art may make various alterations and changes that are not detached from the spirit and scope of the present disclosure; therefore, the scope of protection for the present disclosure should be that as defined by the claims.

What is claimed is:

1. A method for controlling an image-recording device, wherein said image-recording device comprises a control button which is a single physical button and a touch screen having a touch function, when the device is in a single key operation mode in which the touch function of the touch screen cannot be used, the method comprising:
   starting a menu page, the menu page having a plurality of action instructions;
   receiving a press on the control button;
   when the press is a first preset press type, selecting one of the plurality of action instructions based on a sliding operation on the menu page, wherein one action instruction is selected at each time of sliding; and
   when the press is a second preset press type, executing a currently selected action instruction and closing the menu page;
   wherein the first preset press type is one of a long press and a short press, the second preset press type is the other one of a long press and a short press, the long press having a longer pressing time than the short press;
   wherein the single key operation mode is entered through system settings;
   wherein the device further comprises a default operation mode in which the touch function of the touch screen can be used, and the default operation mode is employed when the device is not in the single key operation mode; and
   wherein starting the menu page comprises:
   starting the menu page when the image-recording device is in a single key operation mode and the control button receives a press of the second preset press type.

2. The method according to claim 1, wherein the action instructions include at least one of a shutdown instruction, a photographing instruction, a video recording instruction, an album viewing instruction, and a WiFi on/off instruction.

3. The method according to claim 1, wherein the first preset press type is a short press, and the second preset press type is a long press.

4. An apparatus for controlling an image-recording device that includes a control button which is a single physical button and a touch screen having a touch function, the apparatus comprising:
   a memory storing instructions; and
   a processor configured to execute the instructions when the device is in a single key operation mode, in which the touch function of the touch screen cannot be used, to:
   start a menu page, the menu page having a plurality of action instructions;
   receive a press on the control button;
   when the press is a first preset press type, select one of the plurality of action instructions based on a sliding operation on the menu page, wherein one action instruction is selected at each time of sliding; and
   when the press is a second preset press type, execute a currently selected action instruction and closing the menu page;
   wherein the first preset press type is one of a long press and a short press, the second preset press type is the other one of a long press and a short press, the long press having a longer pressing time than the short press;
   wherein the single key operation mode is entered through system settings;
   wherein the device further comprises a default operation mode in which the touch function of the touch screen can be used, and the default operation mode is employed when the device is not in the single key operation mode; and
   wherein the processor is further configured to execute the instructions to:
   start the menu page when the image-recording device is in a single key operation mode and the control button receives a press of the second preset press type.

5. The apparatus according to claim 4, wherein the action instructions include at least one of a shutdown instruction, a photographing instruction, a video recording instruction, an album viewing instruction, and a WiFi on/off instruction.

6. The apparatus according to claim 4, wherein the first preset press type is a short press, and the second preset press type is a long press.

* * * * *